Dec. 7, 1926.
T. E. BISSELL
1,609,602
TILLAGE IMPLEMENT
Filed August 13, 1923    2 Sheets-Sheet 1
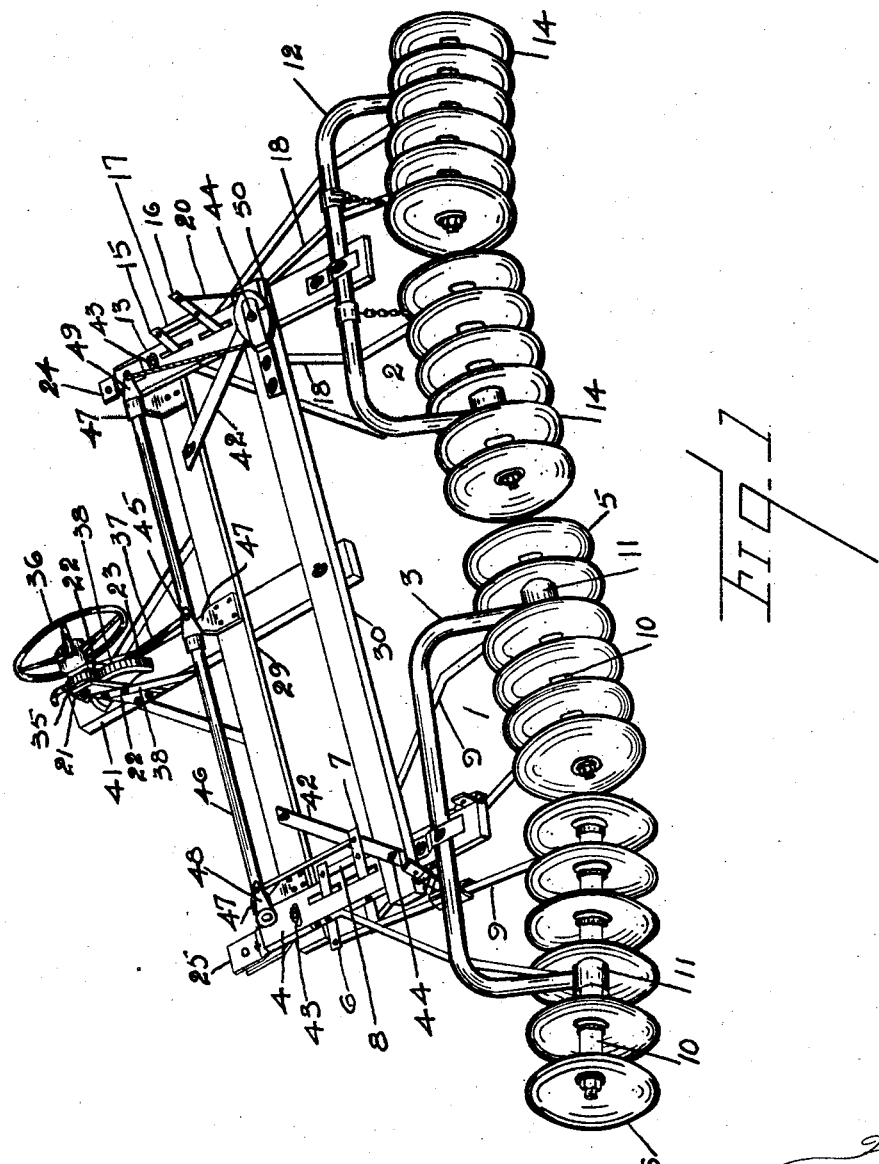

Dec. 7, 1926.  
T. E. BISSELL  
TILLAGE IMPLEMENT  
Filed August 13, 1923  
1,609,602  
2 Sheets-Sheet 2
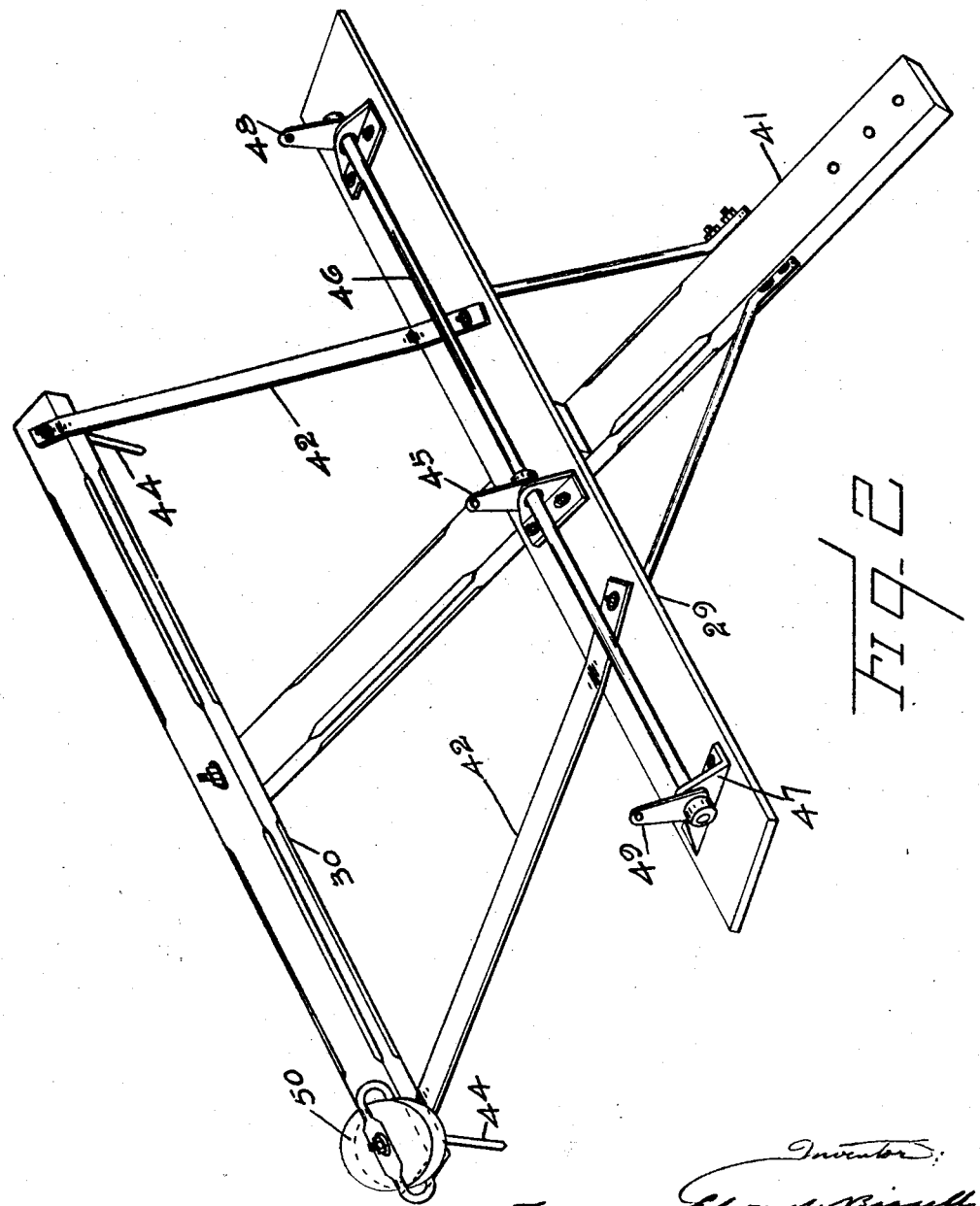

Patented Dec. 7, 1926.

1,609,602

UNITED STATES PATENT OFFICE.

TORRANCE EDWARD BISSELL, OF ELORA, ONTARIO, CANADA.

TILLAGE IMPLEMENT.

Application filed August 13, 1923. Serial No. 657,010.

The object of this invention is to construct a tillage implement which can be used as an extended single action disk harrow.

In carrying out this object I employ two disk harrows, each comprising a harrow frame, draught pole, disk gangs, and adjusting means for altering the cutting angles of the disk gangs relatively to the line of draught, and I combine with the disk harrows a coupling frame, which can be flexibly and detachably connected with the draught poles for maintaining the relative positions of the disk harrows when extended as a single action harrow, and I provide this coupling frame with a forwardly extending draught pole for connection with a tractor.

I also employ a controlling mechanism for the disk gang adjusting means which can be mounted on the draught pole of the coupling frame when the harrows are extended as a single action harrow; and for simultaneously actuating the disk gang adjusting means of the two harrows when extended as a single action harrow I combine with this controlling mechanism suitable motion transmitting means such as a rock shaft or the like mounted on the coupling frame and connected with the controlling mechanism and with the disk gang adjusting means.

For an understanding of the invention reference is to be had to the following description and to the accompanying drawings in which:

Fig. 1 is a perspective view of disk harrows coupled as a single action harrow,

Fig. 2 is a perspective view of the detachable frame,

Like characters of reference refer to like parts throughout the specification and drawings.

The tillage implement consists of an out-throw harrow 1 and an in-throw harrow 2 which may be of any usual or approved construction, and a coupling frame with which the disk harrows are flexibly and detachably connected when extended as a single action harrow.

In the preferred construction the out-throw harrow 1 comprises a harrow frame 3, two disk gangs 5 journalled by bearings 11 to the harrow frame, and a draught pole 4 attached to the harrow frame by which the harrow can be connected to a tractor.

Two levers 6 and 7 are fulcrumed to the draught pole 4 and a link 8 is connected to these levers above their fulcrums. At or near the inner ends of the axles 10 of the disk gangs 5 are journal boxes and connecting these journal boxes with the levers 6 and 7, below their fulcrums, are shift rods 9 by which the levers 6 and 7 adjust the disk gangs 5 relatively to the line of draught.

The in-throw harrow 2 consists of a harrow frame 12, draught pole 13, disk gangs 14, levers 15 and 16, links 17, and shift rods 18, similar to, and having the same functions as, those of the out-throw harrow 1.

For actuating the adjusting levers a control device 21 is connected to the pole 41 of the coupling frame when the harrows are extended as a single action harrow. This control device consists of standards 22 provided with braces or stays 38 adapted to be bolted to the draught pole, a segmental gear 23 having its shaft or axle journalled in the standards, a pinion 35 meshing with the segmental gear 23 and having its shaft or axle journalled in the standards, a hand wheel 36 fixed on the shaft or axle and a pitman 37 knuckled or otherwise connected with the segmental gear 23.

When the harrows are extended as a single action harrow their draught poles are flexibly and removably connected to a coupling frame. This coupling frame consists of two parallel bars or planks 29 and 30, a forwardly extending draught pole 41 bolted to these bars or planks and stays 42 extending diagonally from the ends of the plank 30 to the plank 29 in the vicinity of the draught pole 41. The plank 29 is slightly tilted relatively to the horizontal plane of the frame and the rear edge of the plank 29 is slightly below the level of the under surface of the plank 30.

In assembling the implement as a single action harrow the two disk harrows 1 and 2 are placed in parallel planes with the poles 4 and 13 above the plank 29 and beneath the plank 30, the in-throw harrow being at the right side and the out-throw harrow at the left side of the frame, viewing from behind the implement. A thin large washer is placed between the under side of each of the draught poles 4 and 13 and the top side of the plank 29 and bolts 43 are inserted through the draught poles, washers, and the plank, and left somewhat loose to allow the pole to rock and vibrate when the harrows are at work. The rear cross plank is attached by eye bolts 44 inserted through the draught poles 4 and 13 which flexibly connect the rear cross plank and the draught poles, this being essential for the lateral and vertical movement of the harrows when at work.

When the harrows are extended as a single action harrow the control is connected to the draught pole 41 in front of the plank 29. In this arrangement the standards 22 and stays 38 are bolted to the pole 41 and the pitman 37 is pivotally connected with a crank 45 fixed on the rock shaft 46. The rock shaft 46 is journalled in bearings 47 mounted upon the plank 29 and is fitted with other cranks 48 and 49. The crank 48 is connected with the lever 7 for the adjustment of the disk gangs 5, and the chain or cable 20 is passed around an idler or pulley 50 journalled to the plank 30 and attached to the crank 49 and to the upper end of the lever 16. The operation of the control 21 rocks the shaft 46 and the rocking movement of the shaft 46 simultaneously adjusts the cutting angles of the disk gangs to the line of draught.

Having thus fully described my invention, what I claim as new and desire to secure by Letters Patent is:

In a tillage implement, a frame for holding the disk harrows extended as a single action harrow comprising a draught pole and two parallel members secured to the draught pole and extending latterally thereof, in combination with two disk harrows each having a draught pole extending beneath one of the parallel members and above the other, and means for flexibly connecting the draught poles of the harrows to the parallel members of the frame whereby the harrows can move laterally and vertically when at work.

Dated at the city of Toronto, in the county of York and Province of Ontario, Dominion of Canada, this first day of August, A. D. 1923.

TORRANCE EDWARD BISSELL.